(No Model.)

J. D. TUFTS.
WAGON BRAKE.

No. 303,957. Patented Aug. 19, 1884.

WITNESSES
M. Toulmin
Edwin L. Bradford

INVENTOR
Joshua D. Tufts

Jos. A. Hunter
Attorney

UNITED STATES PATENT OFFICE.

JOSHUA D. TUFTS, OF JACKSON, OHIO.

WAGON-BRAKE.

SPECIFICATION forming part of Letters Patent No. 303,957, dated August 19, 1884.

Application filed May 5, 1884. (No model.)

*To all whom it may concern:*

Be it known that I, JOSHUA D. TUFTS, a citizen of the United States, residing at Jackson, in the county of Jackson and State of Ohio, have invented certain new and useful Improvements in Wagon-Brakes, of which the following is a specification, reference being had therein to the accompanying drawings.

This invention relates to improvements in wagon-brakes; and it has for its object to furnish a portable brake for wagons, which may be attached to the running-gear of wagons, and which may be kept on sale by hardware stores for that purpose. This object is attained by the mechanism illustrated in the accompanying drawings, forming a part of this specification, in which—

Figure 1:
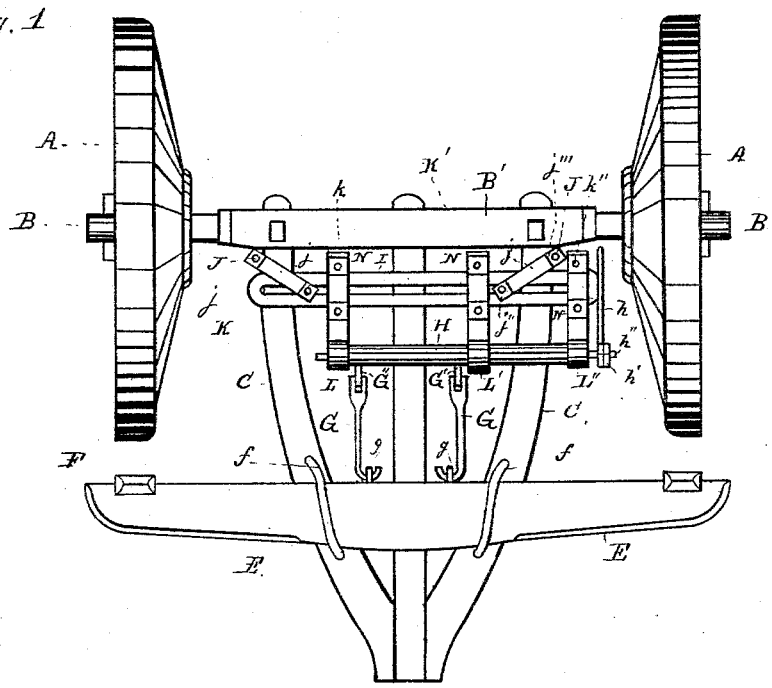
Figure 2:
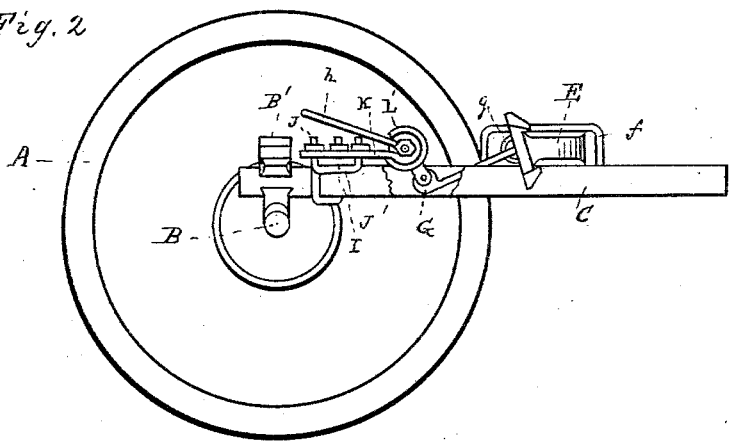

Figure 1 is a plan. Fig. 2 is a longitudinal section.

The letter A indicates the wheels of a wagon; B, the axle; C, the hounds; D, the coupling-pole; E, a brake-beam and brake-shoes.

I is a slotted bar, of iron, secured to the hounds C by U-shaped straps J J', threaded at their upper ends, and provided with plates $j\,j'$ and nuts $j''\,j'''$. One leg of each strap is passed upwardly through the slot of the bar I, and the other leg on the outside of each of the hounds C, respectively. The plates $j\,j'$ are then placed in position, and the nuts $j''\,j'''$ screwed down. This fastens the brake machinery securely to the hounds, and at the same time allows it to be adjusted to fit different-sized vehicles.

K K' K'' are plates having their outer ends, L L' L'', turned, so as to form bearings for a rock-shaft, H. These plates are secured to the bar I by means of straps $k\,k'\,k''$, the upper ends of which are threaded, and provided with nuts N. This arrangement permits the adjustment of the rock-shaft H in a longitudinal direction, so as to meet the requirements of different-sized vehicles. The rock-shaft H is provided at one end with a handle, $h$, secured thereto by a nut and screw, and also with short projecting arms G' G'', to which are pivoted bifurcated rods G, having hooks at the outer ends, which engage with eyebolts $g$, attached to the brake-beam E, thereby connecting the beam and the shaft H to each other, and by means of which the beam may be moved to or from the periphery of the wheels A, and thereby bring the shoes F in contact therewith, when the handle $h$ is moved in a forward direction, or break the contact by moving the handle $h$ in a backward direction, according as it is required to lock or to unlock the wheels. The beam E is secured to the hounds C by the straps $f$, which are so arranged as to permit the free movement of the beam in a backward and forward direction.

Having described my invention, what I desire to secure by Letters Patent, and claim, is—

In a wagon-brake, the slotted bar I, the straps J J', nuts $j''$, the plates K K' K'', having bearings L L' L'', the rock-shaft H, having handle $h$, and projecting arms G' G'', having rods G pivoted thereto, in combination with eyebolts $g$, beams E, shoes F, straps $f$, and the hounds C, as shown and described, and for the purposes set forth.

In testimony whereof I affix my signature in presence of two witnesses.

JOSHUA D. TUFTS.

Witnesses:
THOMAS A. JONES,
JAMES M. TRIPP.